US011663273B2

(12) United States Patent
Gruhl et al.

(10) Patent No.: US 11,663,273 B2
(45) Date of Patent: May 30, 2023

(54) COGNITIVE HORIZON SURVEILLANCE

(71) Applicant: International Business Machines Corporation, Armonk, NY (US)

(72) Inventors: Daniel Gruhl, San Jose, CA (US); Linda Ha Kato, San Jose, CA (US); Petar Ristoski, San Jose, CA (US); Steven R. Welch, Gilroy, CA (US); Chad Eric DeLuca, Morgan Hill, CA (US); Anna Lisa Gentile, San Jose, CA (US); Alfredo Alba, Morgan Hill, CA (US); Dmitry Zubarev, San Jose, CA (US); Chandrasekhar Narayan, San Jose, CA (US); Nathaniel H. Park, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 16/917,638

(22) Filed: Jun. 30, 2020

(65) Prior Publication Data

US 2021/0406314 A1 Dec. 30, 2021

(51) Int. Cl.
*G06F 16/9038* (2019.01)
*G06F 16/9032* (2019.01)
(Continued)

(52) U.S. Cl.
CPC ........ *G06F 16/9038* (2019.01); *G06F 16/906* (2019.01); *G06F 16/90328* (2019.01);
(Continued)

(58) Field of Classification Search
CPC ........... G06F 16/9038; G06F 16/90328; G06F 16/90335; G06F 16/906; G06F 16/93; G06N 3/08
See application file for complete search history.

(56) References Cited

U.S. PATENT DOCUMENTS

| | | | | |
|---|---|---|---|---|
| 7,496,561 | B2 | 2/2009 | Caudill et al. | |
| 7,653,622 | B2 * | 1/2010 | Huentelman | G06F 16/353 707/999.005 |

(Continued)

FOREIGN PATENT DOCUMENTS

| | | | |
|---|---|---|---|
| KR | 102054514 | B1 | 12/2019 |

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Anhtai V Tran
*Assistant Examiner* — Xiaoqin Hu
(74) *Attorney, Agent, or Firm* — Sherman IP LLP; Kenneth L. Sherman; Hemavathy Perumal

(57) ABSTRACT

A method for ranking relevance of documents includes using a set of queries, searching a corpus of documents for a set of candidate documents with information relevant to the set of queries. The method further includes ranking the set of candidate documents by a deep learning processing system according to relevance to respective ones of the set of queries. The method additionally includes responsive to user input, revising the ranked set of candidate documents to produce a revised ranked set of candidate documents. The method further includes using the revised ranked set of candidate documents to retrain the deep learning processing system. The method still further includes performing a categorization of the set of candidate documents by the retrained deep learning processing system.

19 Claims, 17 Drawing Sheets

(51) Int. Cl.

| | |
|---|---|
| ***G06F 16/93*** | (2019.01) |
| ***G06F 16/903*** | (2019.01) |
| ***G06F 16/906*** | (2019.01) |
| ***G06N 3/08*** | (2023.01) |

(52) U.S. Cl.

CPC ........ *G06F 16/90335* (2019.01); *G06F 16/93* (2019.01); *G06N 3/08* (2013.01)

(56) References Cited

U.S. PATENT DOCUMENTS

| | | | | |
|---|---|---|---|---|
| 7,840,569 | B2 | 11/2010 | Meyerzon et al. | |
| 8,180,754 | B1 | 5/2012 | Ershov | |
| 8,214,361 | B1 * | 7/2012 | Sandler | G06F 16/35 707/732 |
| 9,514,405 | B2 | 12/2016 | Chen et al. | |
| 9,535,960 | B2 | 1/2017 | Guo et al. | |
| 2005/0004905 | A1 | 1/2005 | Dresden | |
| 2009/0006360 | A1 * | 1/2009 | Liao | G06F 16/284 |
| 2011/0252012 | A1 * | 10/2011 | Kanduri | G06F 16/9535 707/706 |
| 2015/0310115 | A1 * | 10/2015 | Ryger | G06F 16/93 707/708 |
| 2018/0341871 | A1 | 11/2018 | Maitra et al. | |
| 2020/0175076 | A1 * | 6/2020 | Powers | G06Q 50/01 |
| 2021/0089614 | A1 * | 3/2021 | Jain | G06N 3/0454 |

OTHER PUBLICATIONS

Agrawal, D., et al., "Explore/Exploit Schemes for Web Content Optimization", ICDM '09: Proceedings of the 2009 Ninth IEEE International Conference on Data Mining, Dec. 2009, pp. 1-10, IEEE, United States {Abstract Only}.

* cited by examiner

300

Please select the categories you would like to review:

- ☐ Colours
- ☐ Titanium Dioxide
- ☐ Endocrine disruptor - BPA
- ☐ Food Fraud
- ☐ Nanotechnology
- ☐ Gums
- ☐ Allergens
- ☐ Pesticide Residue
- ☐ Heavy Metals
- ☐ Mycotoxins
- ☐ Sweeteners

| Accepted | All ○ All ○ All × |
|---|---|
| 1. Exposure Assessment for Toxic Hepatitis... | ○ × ٩ |
| 2. Expanded diagnostic approach to Hepatitis... | ○ × ٩ |
| 3. Hepatitis E virus infection: An old viru... | ○ × ٩ |

1300

| Candidates (2122 unshown) | All ✓  All ✗ |
|---|---|
| 1. Is **botulism** type C transmissible to human by consumption of contaminated poultry meat? Analysis of a suspect outbreak in French Guyana. | ✓ ✗

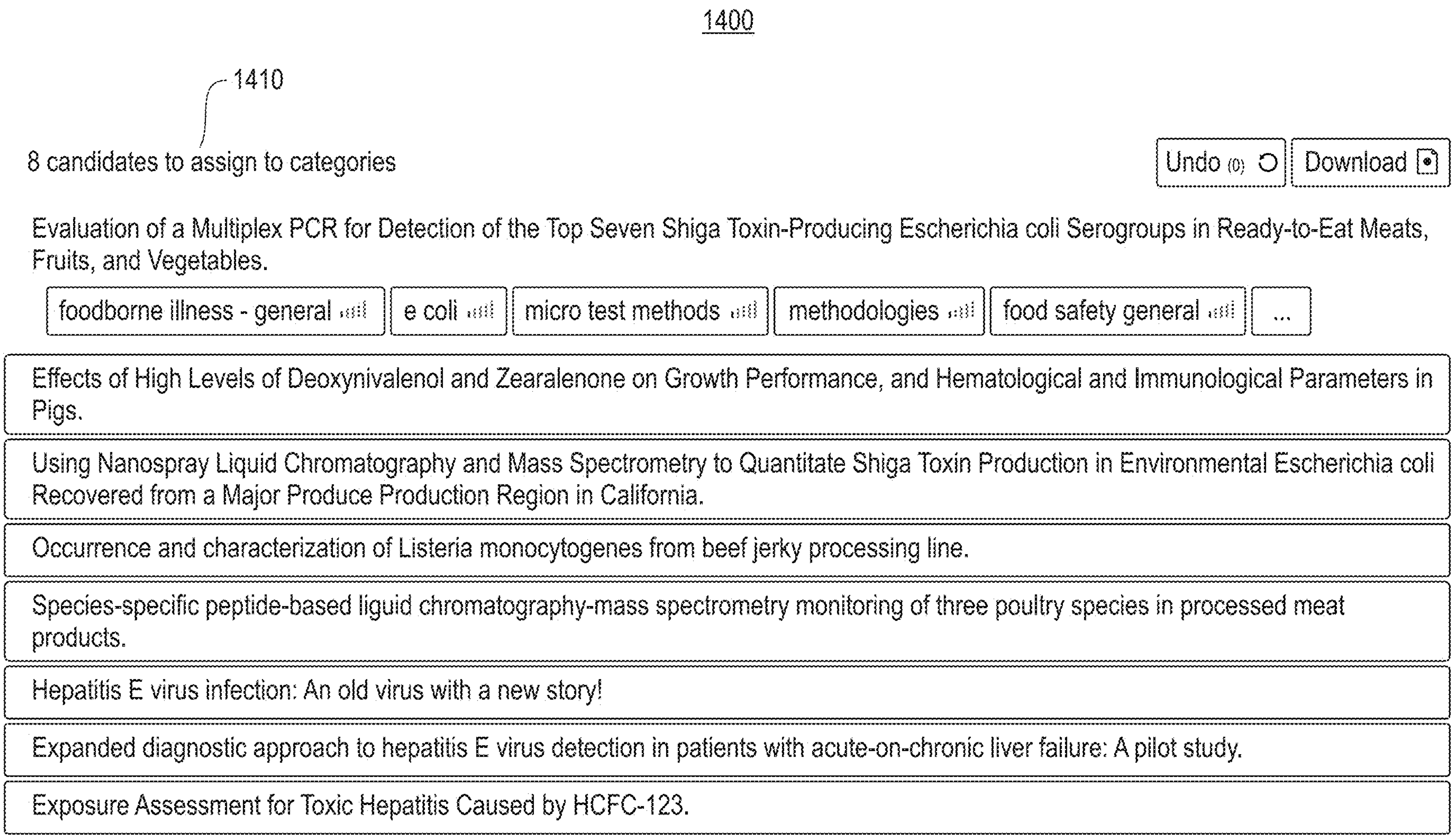

1410
8 candidates to assign to categories

Evaluation of a Multiplex PCR for Detection of the Top Seven Shiga Toxin-Producing Escherichia coli Serogroups in Ready-to-Eat Meats, Fruits, and Vegetables.

| foodborne illness - general | e coli | micro test methods | methodologies | food safety general | ... |

| |
|---|
| Effects of High Levels of Deoxynivalenol and Zearalenone on Growth Performance, and Hematological and Immunological Parameters in Pigs. |
| Using Nanospray Liquid Chromatography and Mass Spectrometry to Quantitate Shiga Toxin Production in Environmental Escherichia coli Recovered from a Major Produce Production Region in California. |
| Occurrence and characterization of Listeria monocytogenes from beef jerky processing line. |
| Species-specific peptide-based liquid chromatography-mass spectrometry monitoring of three poultry species in processed meat products. |
| Hepatitis E virus infection: An old virus with a new story! |
| Expanded diagnostic approach to hepatitis E virus detection in patients with acute-on-chronic liver failure: A pilot study. |
| Exposure Assessment for Toxic Hepatitis Caused by HCFC-123. |

Undo (0) ◯ | Download ⊡

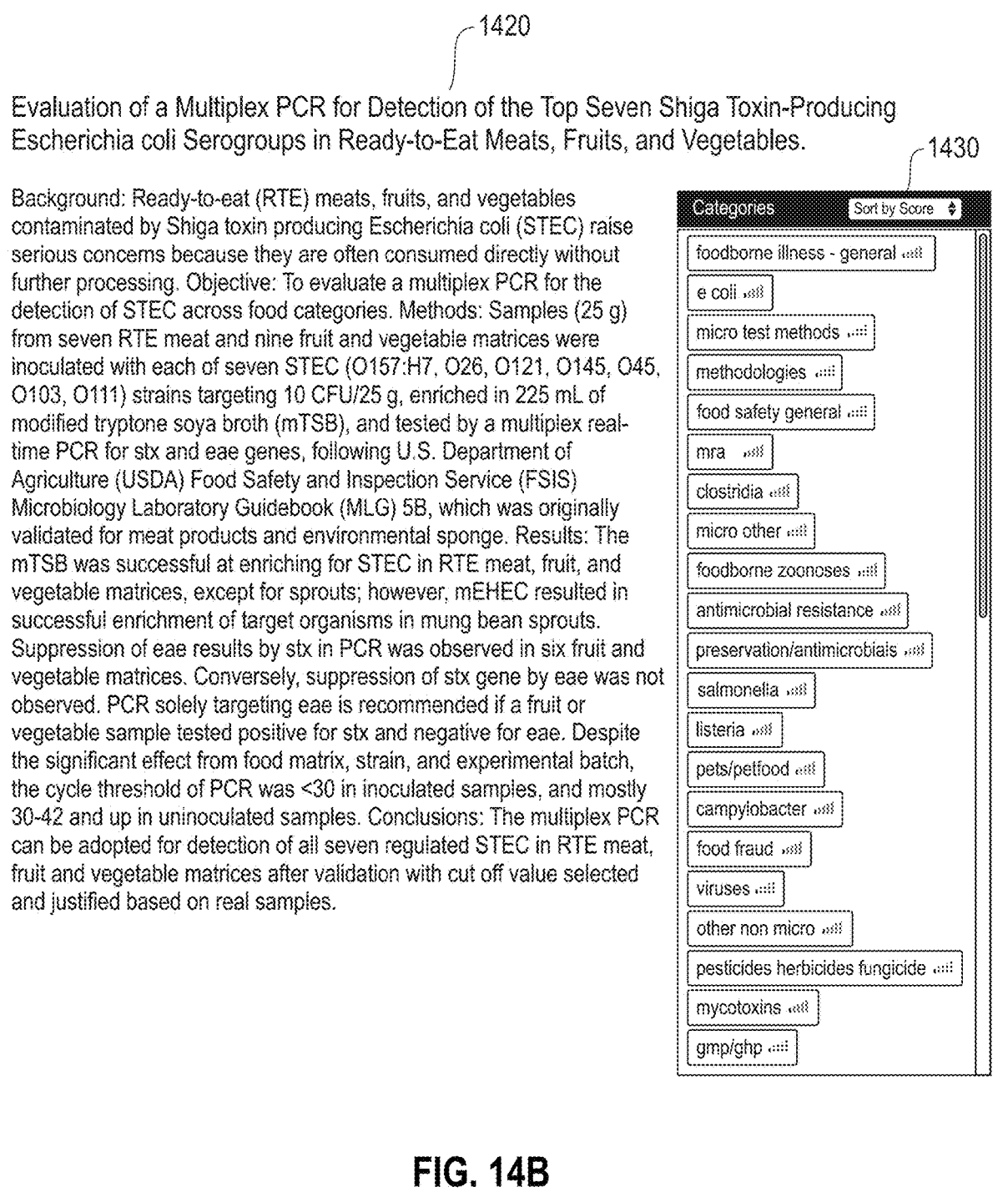

1420

Evaluation of a Multiplex PCR for Detection of the Top Seven Shiga Toxin-Producing Escherichia coli Serogroups in Ready-to-Eat Meats, Fruits, and Vegetables.

Background: Ready-to-eat (RTE) meats, fruits, and vegetables contaminated by Shiga toxin producing Escherichia coli (STEC) raise serious concerns because they are often consumed directly without further processing. Objective: To evaluate a multiplex PCR for the detection of STEC across food categories. Methods: Samples (25 g) from seven RTE meat and nine fruit and vegetable matrices were inoculated with each of seven STEC (O157:H7, O26, O121, O145, O45, O103, O111) strains targeting 10 CFU/25 g, enriched in 225 mL of modified tryptone soya broth (mTSB), and tested by a multiplex real-time PCR for stx and eae genes, following U.S. Department of Agriculture (USDA) Food Safety and Inspection Service (FSIS) Microbiology Laboratory Guidebook (MLG) 5B, which was originally validated for meat products and environmental sponge. Results: The mTSB was successful at enriching for STEC in RTE meat, fruit, and vegetable matrices, except for sprouts; however, mEHEC resulted in successful enrichment of target organisms in mung bean sprouts. Suppression of eae results by stx in PCR was observed in six fruit and vegetable matrices. Conversely, suppression of stx gene by eae was not observed. PCR solely targeting eae is recommended if a fruit or vegetable sample tested positive for stx and negative for eae. Despite the significant effect from food matrix, strain, and experimental batch, the cycle threshold of PCR was <30 in inoculated samples, and mostly 30-42 and up in uninoculated samples. Conclusions: The multiplex PCR can be adopted for detection of all seven regulated STEC in RTE meat, fruit and vegetable matrices after validation with cut off value selected and justified based on real samples.

1430

Categories | Sort by Score

- foodborne illness - general
- e coli
- micro test methods
- methodologies
- food safety general
- mra
- clostridia
- micro other
- foodborne zoonoses
- antimicrobial resistance
- preservation/antimicrobials
- salmonella
- listeria
- pets/petfood
- campylobacter
- food fraud
- viruses
- other non micro
- pesticides herbicides fungicide
- mycotoxins
- gmp/ghp

FIG. 14B

COGNITIVE HORIZON SURVEILLANCE

BACKGROUND

The field of embodiments of the present invention relates to cognitive horizon surveillance including intelligent ranking of content and automatic categorization.

Services, such as GOOGLE® Scholar, SCOPUS®, and PUBMED®, to name a few, enable access to scientific content that was not historically achievable at the same speed. Many of these services rely on standard retrieval mechanisms for a user to find relevant content, which may typically be some form of a keyword search combined with various value selections (e.g., author, date, etc.).

The semantic Web community has developed beyond the barrier of keyword searching by designing methods to represent and query the data beyond mere keywords, such as using knowledge graphs. Some publishers benefit by augmenting scholarly content, for example encouraging authors to include semantically annotated content. While the conventional techniques have enabled a variety of semantically oriented tasks, such as knowledge discovery, knowledge exploration and data integration in the field of scholarly data, broader systems are needed that can cooperate with the user in the task of horizon scanning.

SUMMARY

Embodiments relate to cognitive horizon surveillance including intelligent ranking of content and automatic categorization. One embodiment provides a method for ranking relevance of documents. The method includes using a set of queries, searching a corpus of documents for a set of candidate documents with information relevant to the set of queries. The method further includes ranking the set of candidate documents by a deep learning processing system according to relevance to respective ones of the set of queries. The method additionally includes responsive to user input, revising the ranked set of candidate documents to produce a revised ranked set of candidate documents. The method further includes using the revised ranked set of candidate documents to retrain the deep learning processing system. The method still further includes performing a categorization of the set of candidate documents by the retrained deep learning processing system. The embodiments significantly reduce workload by a large factor (e.g., a factor of twenty (20)). Some features contribute to the advantage of significantly improving the efficiency of users and ensures a low probability of missing relevant articles/documents/etc. Some other features contribute to the advantage of offering a functionality for the automatic categorization of articles/documents/etc., to assist in suggesting which experts might be most appropriate to act upon it.

One or more of the following features may be included. In some embodiments, the deep learning processing system finds documents to reject for determining candidate documents.

In some embodiments, the method may further include updating the set of queries based on a periodic schedule.

In some embodiments, the method may additionally include the feature that the categorization is based according to a set of user defined categories.

In one or more embodiments, the method may include responsive to user input, revising the set of user defined categories.

In some embodiments, the method may further include responsive to user input, selecting one of the set of queries; and displaying, using a user interface, categorized documents which satisfy the selected query.

In one or more embodiments, the method may additionally include performing the categorization of the set of candidate documents by the retrained deep learning processing system comprises ranking categorizations based on prediction for most likely categorizations.

In some embodiments, the method is repeated on a periodic basis, such that the deep learning system is continually retrained.

These and other features, aspects and advantages of the present embodiments will become understood with reference to the following description, appended claims and accompanying figures.

BRIEF DESCRIPTION OF THE DRAWINGS

FIGS. 14A-B illustrate an example SME interface for document categorization after acceptance, according to one embodiment.

DETAILED DESCRIPTION

Figure 1:
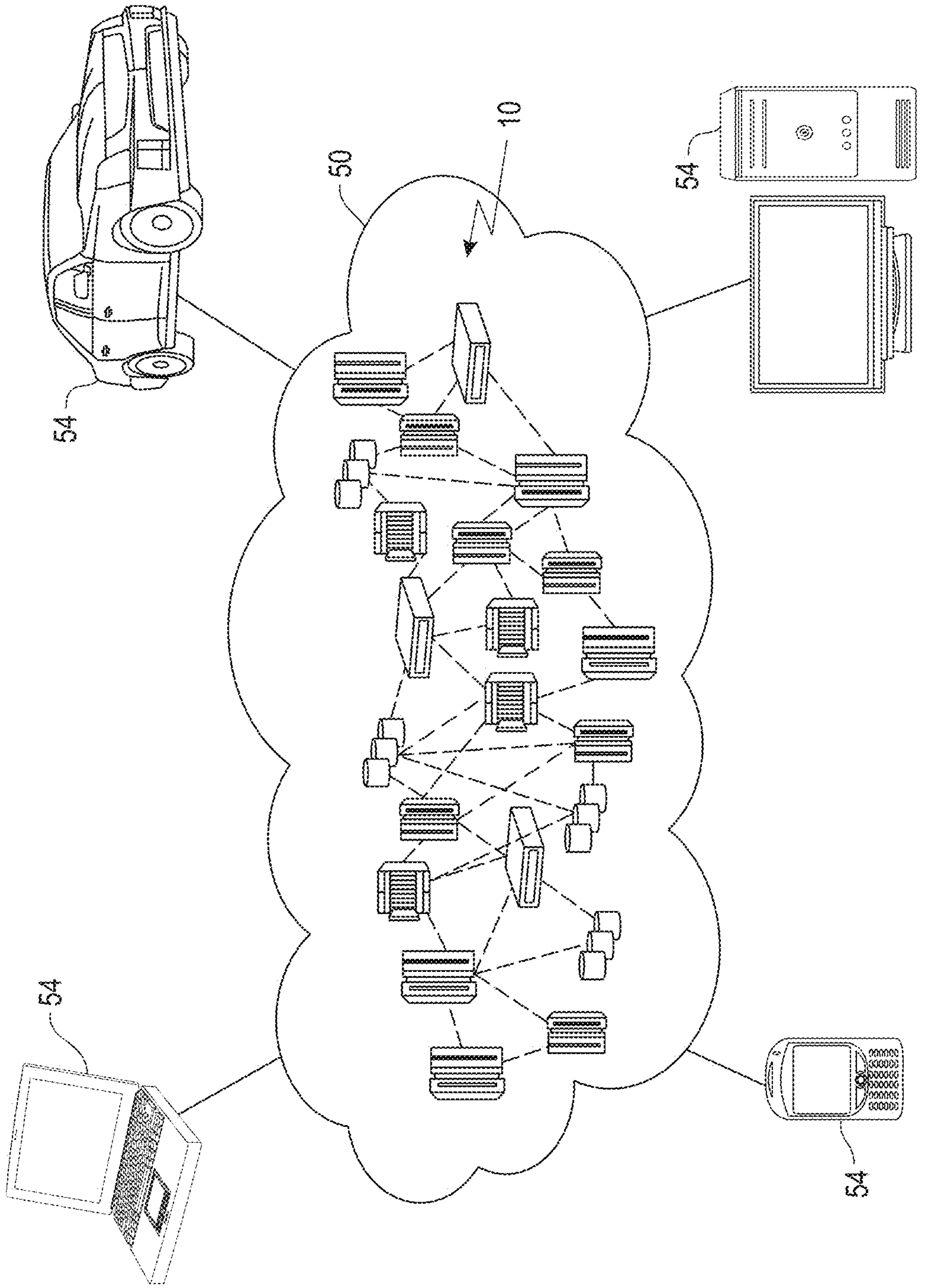
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to cognitive horizon surveillance including intelligent ranking of content and automatic categorization. One embodiment provides a method for ranking relevance of documents. The method includes using a set of queries, searching a corpus of documents for a set of candidate documents with information relevant to the set of queries. The method further includes ranking the set of candidate documents by a deep learning processing system according to relevance to respective ones of the set of queries. The method additionally includes responsive to user input, revising the ranked set of candidate documents to produce a revised ranked set of candidate documents. The method further includes using the revised ranked set of candidate documents to retrain the deep learning processing system. The method still further includes performing a categorization of the set of candidate documents by the retrained deep learning processing system. One or more of the following features may be included. In some embodiments, the deep learning processing system finds documents to reject for determining candidate documents. In some embodiments, the method may further include updating the set of queries based on a periodic schedule. In several embodiments, the method may additionally include the feature that the categorization is based according to a set of user defined categories. In one or more embodiments, the method may include responsive to user input, revising the set of user defined categories. In some embodiments, the method may further include responsive to user input, selecting one of the set of queries; and displaying, using a user interface, categorized documents which satisfy the selected query. In one or more embodiments, the method may additionally include performing the categorization of the set of candidate documents by the retrained deep learning processing system comprises ranking categorizations based on prediction for most likely categorizations. In some embodiments, the method is repeated on a periodic basis, such that the deep learning system is continually retrained.

Artificial intelligence (AI) models may include a trained ML model (e.g., models, such as a neural network (NN), a convolutional NN (CNN), a recurrent NN (RNN), a Long short-term memory (LSTM) based NN, gate recurrent unit (GRU) based RNN, tree-based CNN, self-attention network (e.g., an NN that utilizes the attention mechanism as the basic building block; self-attention networks have been shown to be effective for sequence modeling tasks, while having no recurrence or convolutions), BiLSTM (bi-directional LSTM), etc.). An artificial NN is an interconnected group of nodes or neurons.

A NN is a series of algorithms that have a goal to recognize underlying relationships in a set of data through a process that acts similarly as to the way the human brain works. In this sense, NNs refer to systems of neurons, either organic or artificial in nature. NNs can adapt to changing input; so the network generates the best possible result without needing to redesign the output criteria.

Deep learning (also known as deep structured learning or differential programming) is part of a broader family of machine learning methods based on NNs with representation learning. Learning can be supervised, semi-supervised or unsupervised.

An RNN is a class of artificial NNs where connections between nodes form a directed graph along a temporal sequence. This allows it to exhibit temporal dynamic behavior. Derived from feedforward NNs, RNNs can use their internal state (memory) to process variable length sequences of inputs. This makes DNNs applicable to tasks such as unsegmented, connected handwriting recognition or speech recognition.

Horizon scanning is a technique that is used to explore potential future developments and better anticipate risks. Horizon Scanning involves identifying people with knowledge and expertise in specific areas, querying them to consider factors and forces driving change to a future point in time and synthesizing the findings into relevant reports and actions.

Conventional research groups that perform horizon scanning perform based on keyword searches with the state of the art information retrieval approaches. Most solutions are based on the search engines provided by database engines. The user interface for a search based method of finding a relevant document typically consists of one or more text fields to build a search query (see, e.g., FIG. 7). Although some user interfaces can get more complex, it is not always easy and intuitive for a user to create a complex query that narrows the results to what they need. Additionally, terminology used in the search query may be different between domains or they may change over time. After executing a search query, the user is usually presented with a long list of search results where it is usually ranked by the number of hits.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
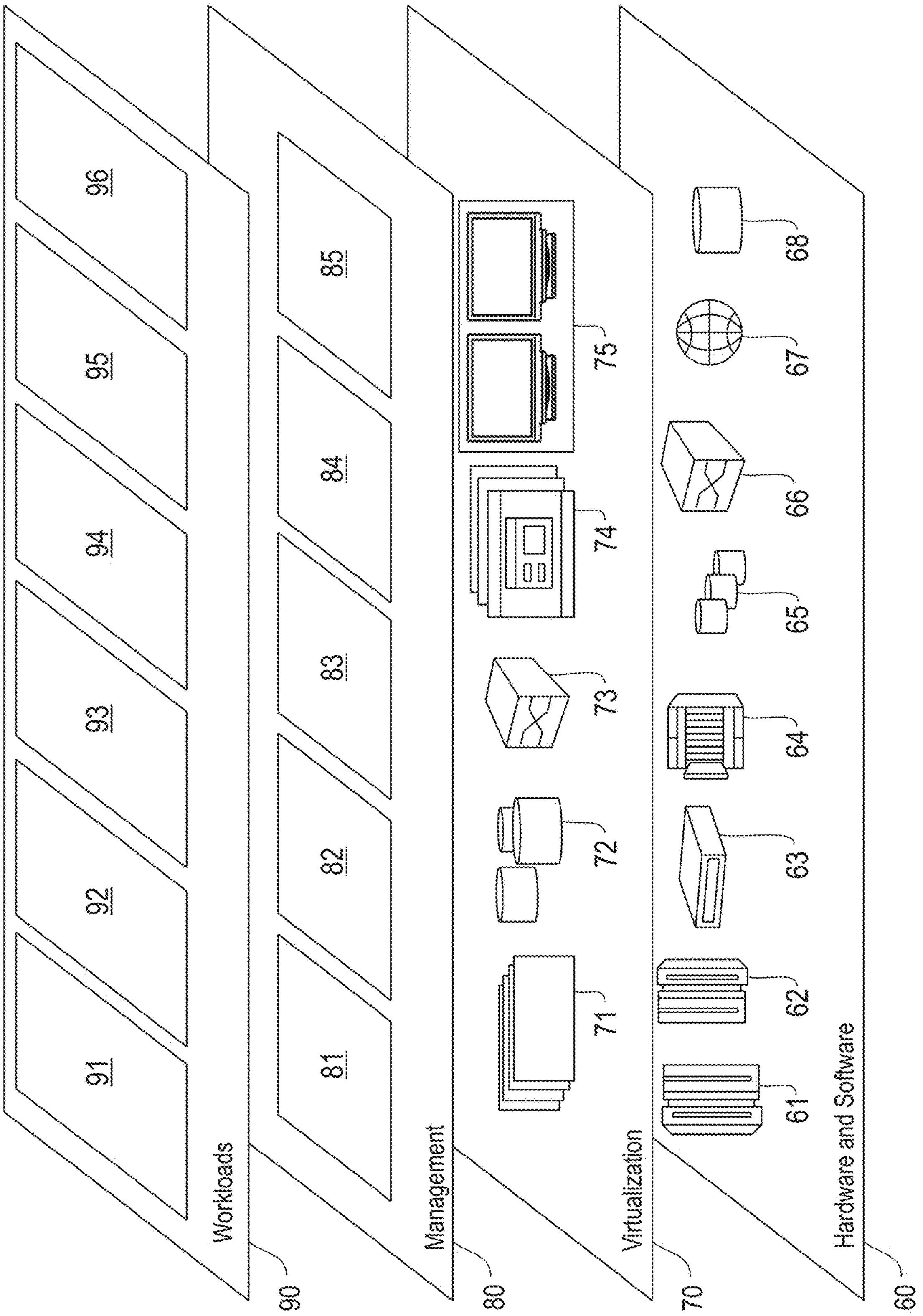
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for cognitive horizon surveillance including intelligent ranking of content and automatic categorization processing 96 (see, e.g., system

Figure 5:
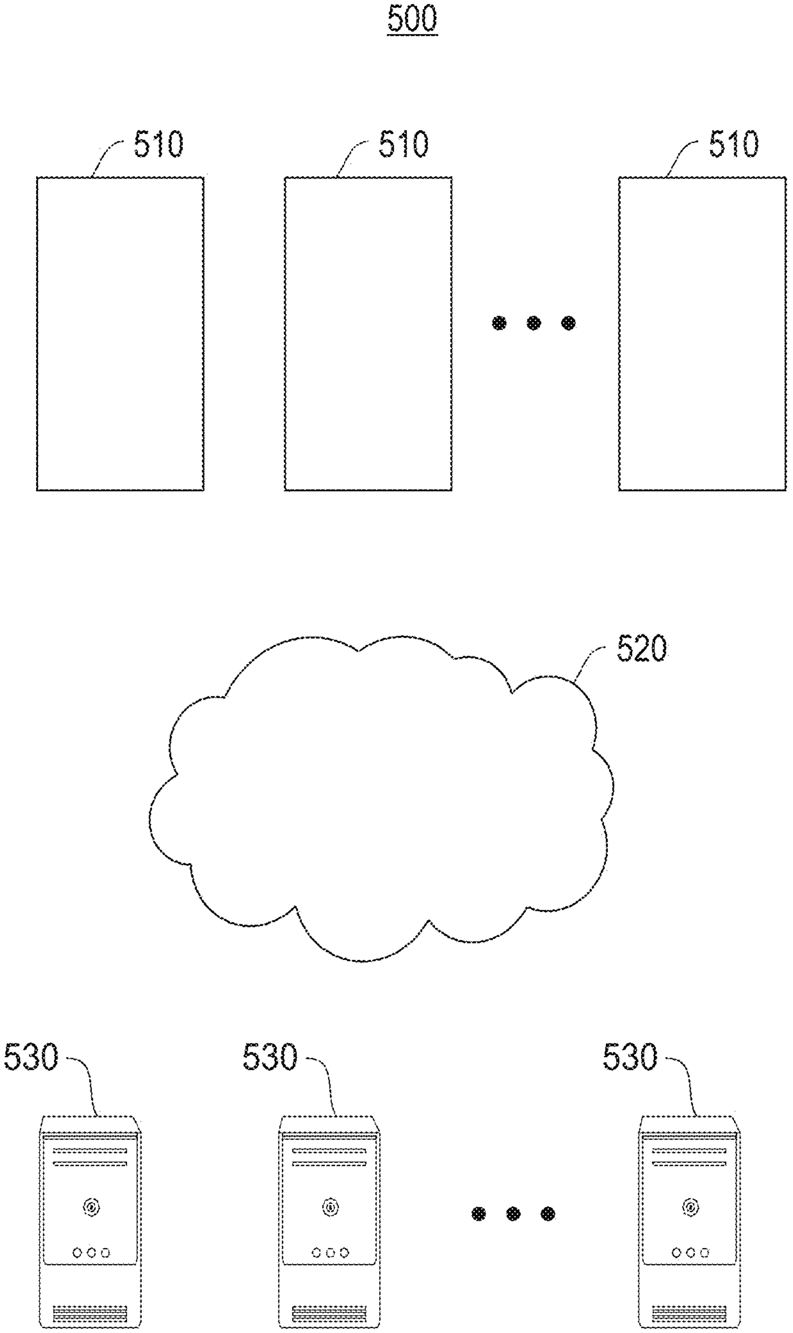
FIG. 5 is a block diagram illustrating a distributed system for cognitive horizon surveillance including intelligent ranking of content and automatic categorization processing, according to one embodiment.

500, FIG. 5 and process 1300, FIG. 13). As mentioned above, all of the foregoing examples described with respect to FIG. 2 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
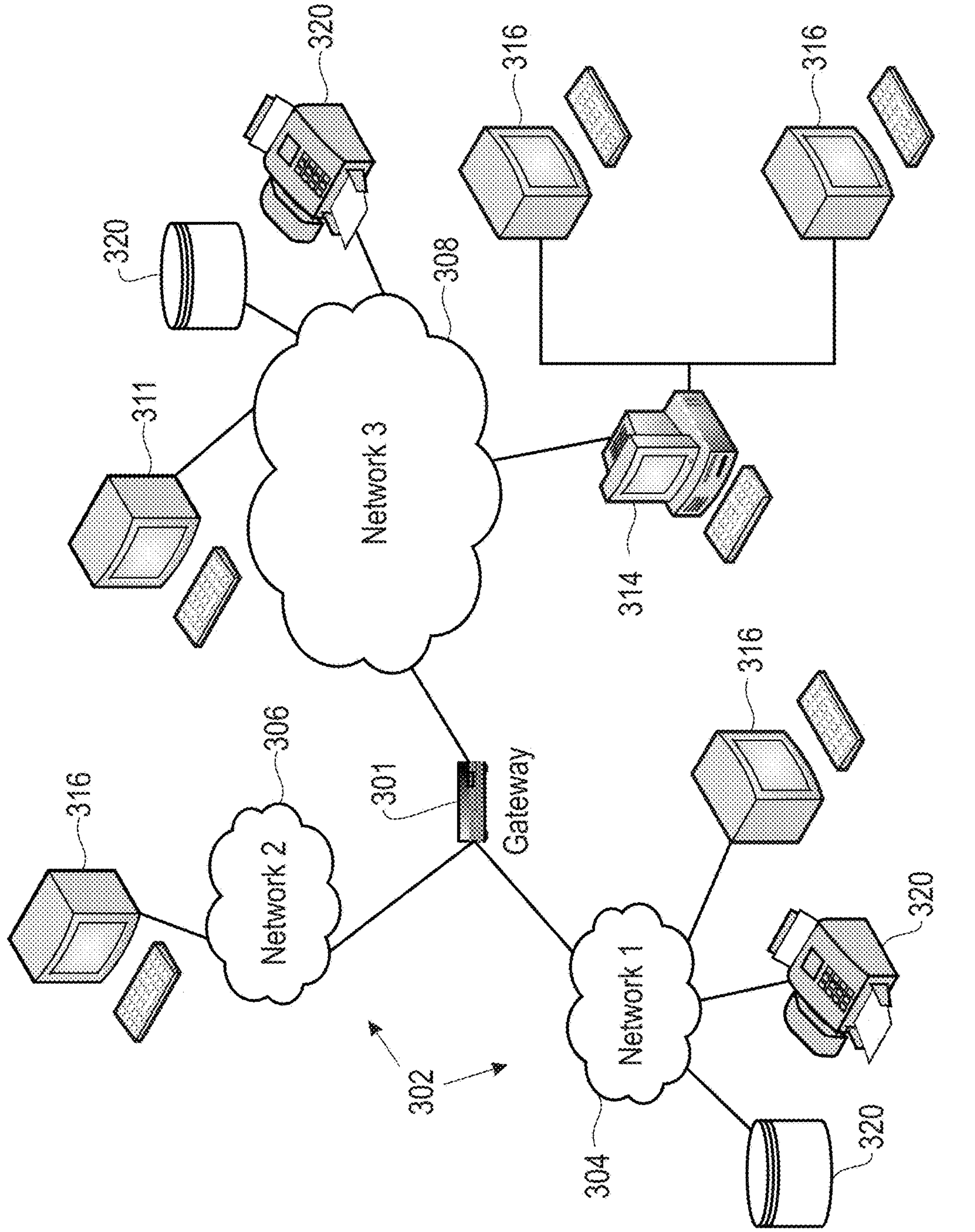
FIG. 3 is a network architecture of a system for cognitive horizon surveillance including intelligent ranking of content and automatic categorization processing, according to an embodiment.

FIG. 3 is a network architecture of a system 300 for cognitive horizon surveillance including intelligent ranking of content and automatic categorization processing, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX® system that emulates an IBM® z/OS environment, a UNIX® system that virtually hosts a MICROSOFT® WINDOWS® environment, a MICROSOFT® WINDOWS® system that emulates an IBM® z/OS environment, etc. This virtualization and/or emulation may be implemented through the use of VMWARE® software in some embodiments.

Figure 4:
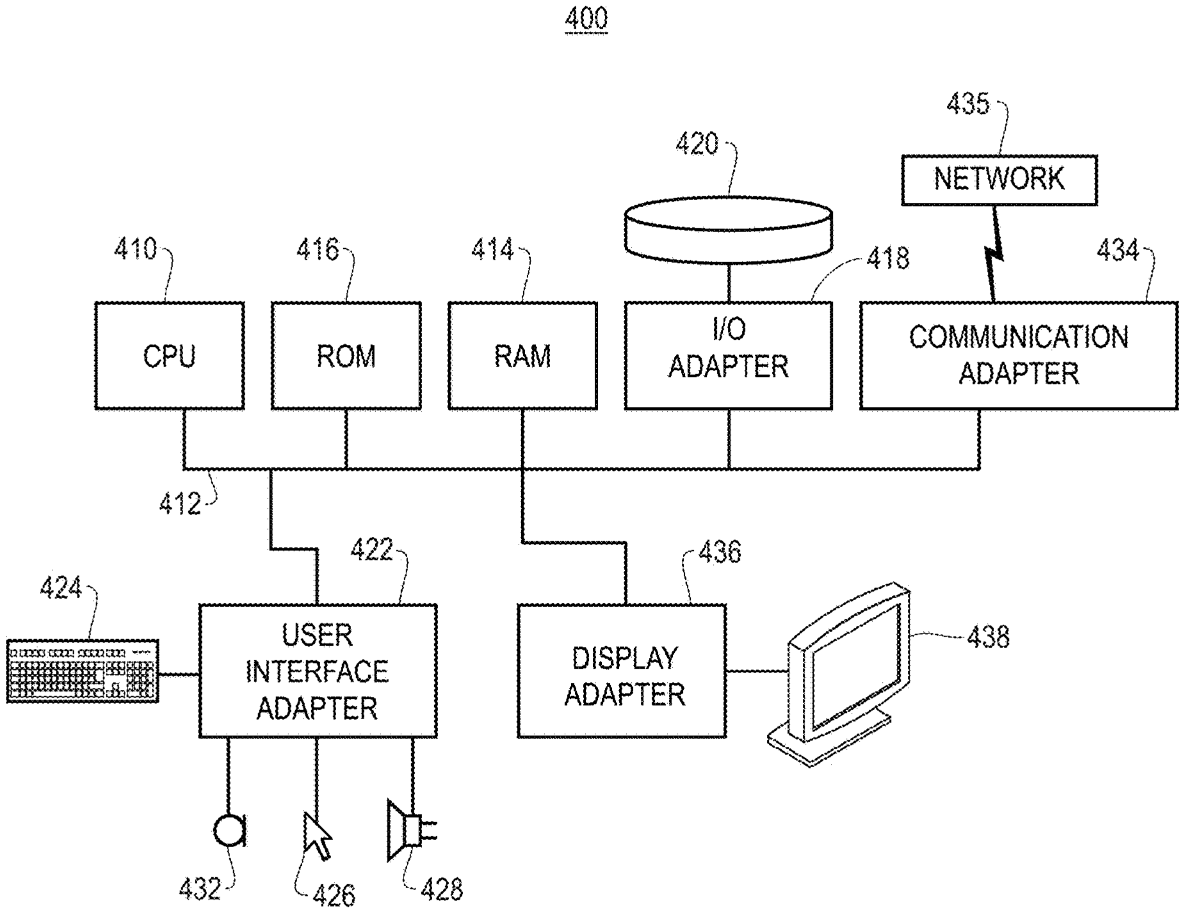
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT® WINDOWS® Operating System (OS), a MAC OS®, a UNIX® OS, etc. In one embodiment, the system 400 employs a POSIX® based file system. It will be appreciated that other examples may also be implemented on platforms and operating systems other than those mentioned. Such other examples may include operating systems written using JAVA®, XML, C, and/or C++ language, or other programming languages, along with an object oriented programming methodology. Object oriented programming (OOP), which has become increasingly used to develop complex applications, may also be used.

FIG. 5 is a block diagram illustrating a distributed system 500 for cognitive horizon surveillance including intelligent ranking of content and automatic categorization processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices 510 are provided with cloud services from the servers 530 through the cloud or resource sharing environment 520.

Figure 6:
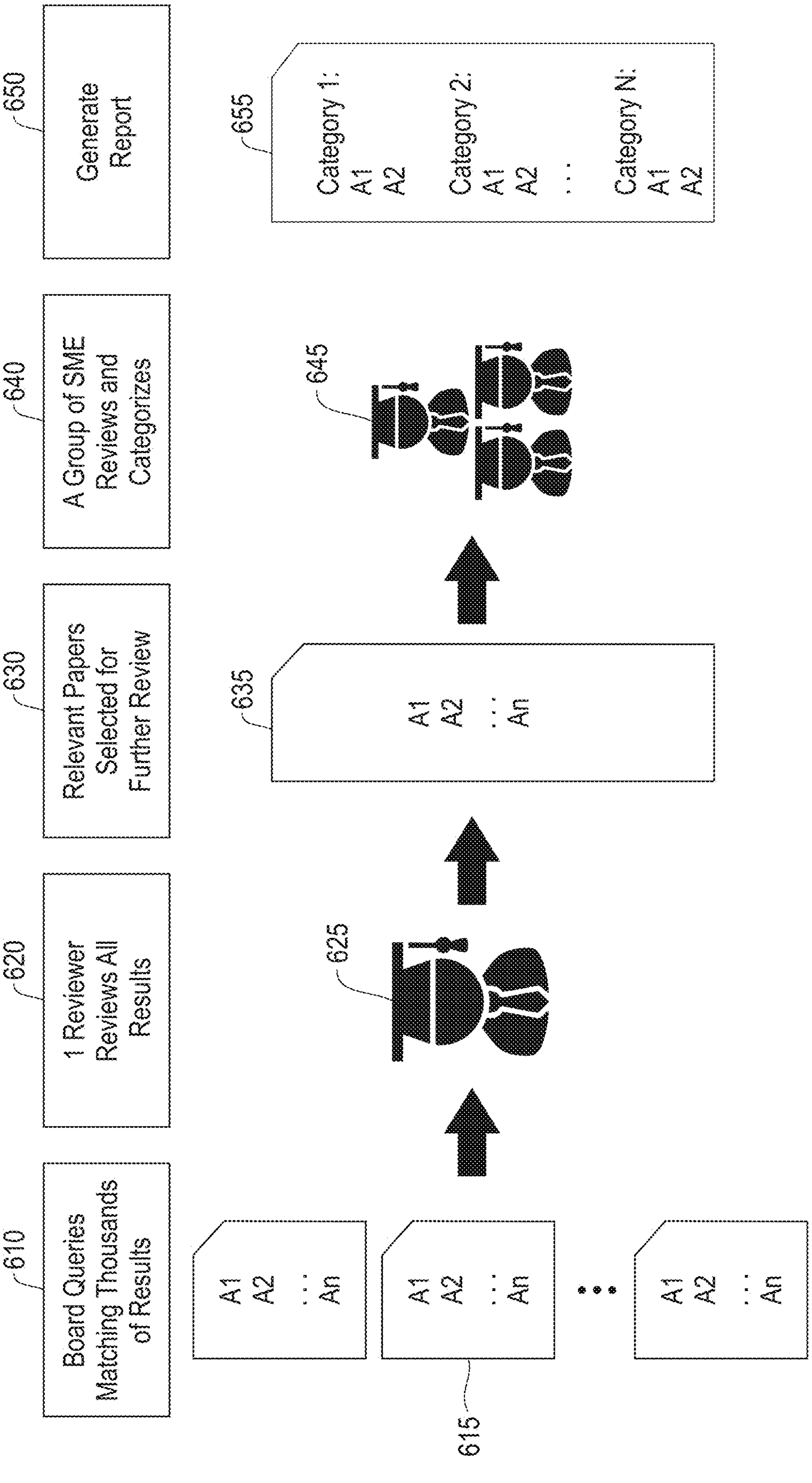
FIG. 6 shows an example architecture for a conventional system for horizon scanning.

FIG. 6 shows an example architecture for a conventional system 600 for horizon scanning. Typically in a conventional system 600, the group of SMEs generates a set of queries, which are registered with exiting publications engines (e.g., PUBMED®). This is shown by block 610 where the broad queries result in matching many (e.g., thousands) of results 615. For each of these queries, the system 600 sends daily email with a list of papers that match some of the keywords from the queries. In block 620, one SME 625 reviews the emails on a daily basis, and in block 630 the SME 625 selects a set of relevant candidate papers/documents 635 that are then forwarded to a group of SMEs 645. In block 640, the group of SMEs 645 reviews the papers/documents, and the selected papers are categorized in the preferred groups. In block 650 a report 655 is generated. The conventional system 600 has several drawbacks. First, the system 600 is based on standard information retrieval approaches based on keywords, which ignores the personal preferences and the feedback from the SMEs 645. Thus, the list of papers in the report 655 is not optimally sorted, and the SMEs 645 must review a lot of papers, which results in high costs and in many cases missing important documents. Second, the system 600 is not centralized, i.e., the SMEs 645 must work with several systems and applications to produce the final list (report 655) of relevant papers. And finally, there is no easy way for the SMEs 645 to collaborate with each other.

Figure 7:
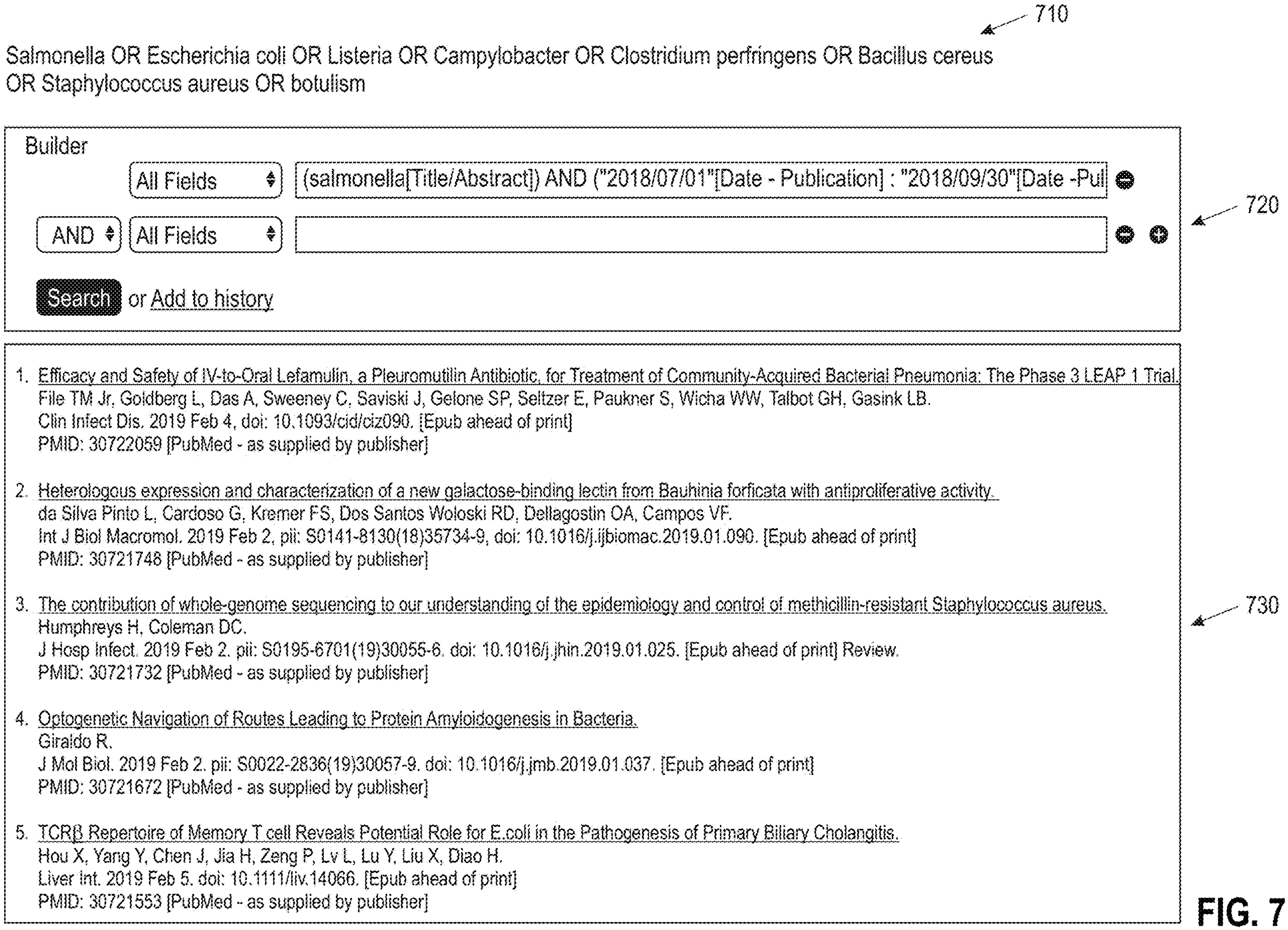
FIG. 7 shows an example user interface and example results using the architecture of FIG. 6.

FIG. 7 shows an example user interface 720 and example results 730 using the architecture of system 600 (FIG. 6). The example user interface shows an entry for conducting a keyword search for the terms 710. Staying up to date with the most recent research studies, technologies and discoveries is crucial for the success of every industry. However, the number of scientific publications, patents, and news articles that appear every day is overwhelming, which cannot be efficiently processed by SMEs on a daily basis. For example, the volume of publications related to the broad category of "materials"' is on the order of one hundred thousand a year. Keyword-based search reduces this number but not sufficiently, often to the order of 1K-10K documents. The documents that pass the keyword filter still require personal evaluation by SMEs. This pattern of interaction with unstructured data has two major detrimental effects in research context: relevant publications are missed, either because of the SME's loss of focus or inability to review the entire set of documents; and biases driving SMEs judgment are reinforced, contributing to the conceptual stagnation in research.

Figure 8:
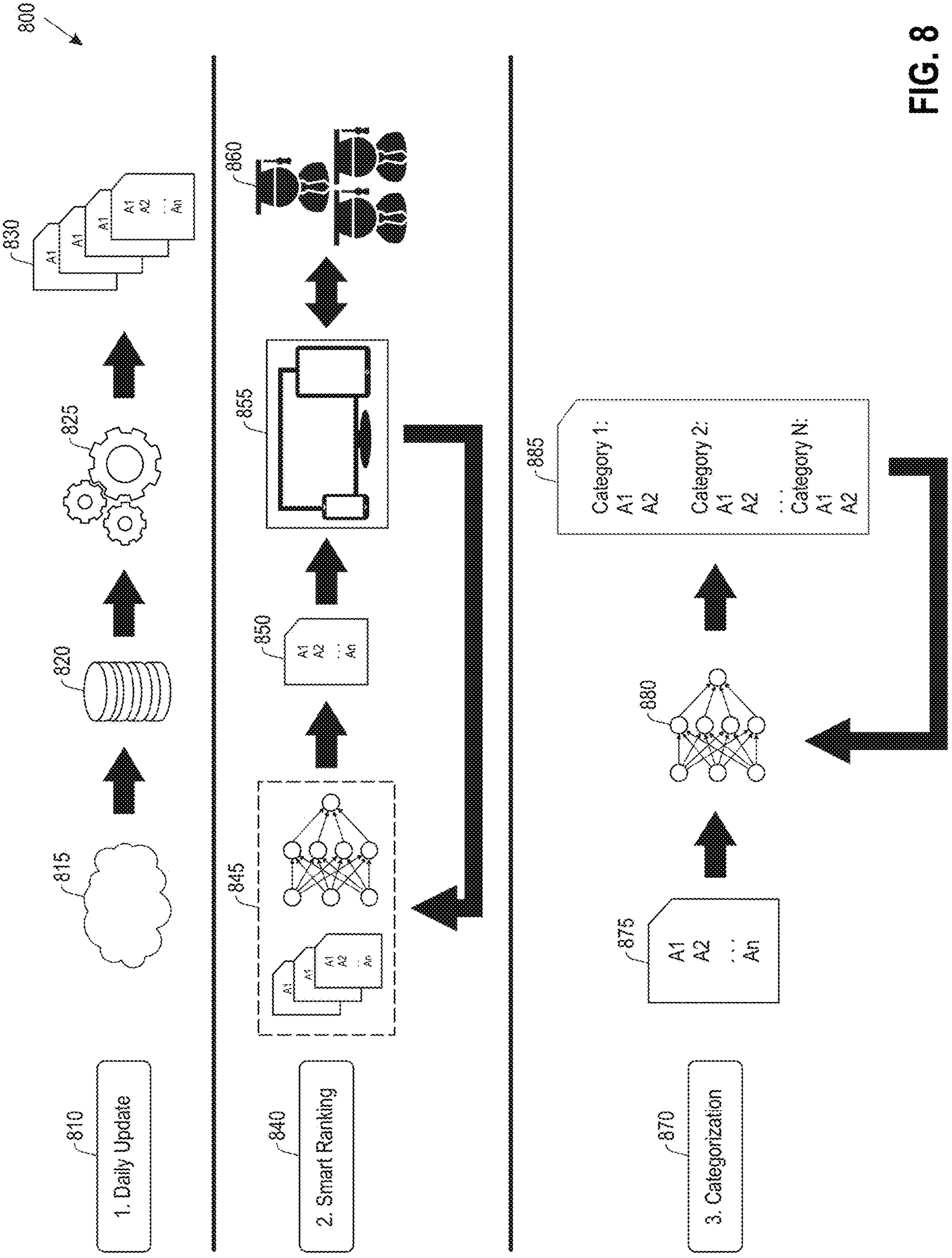
FIG. 8 shows an architecture for cognitive horizon surveillance including intelligent ranking of content and automatic categorization, according to one embodiment.

FIG. 8 shows an architecture 800 for cognitive horizon surveillance including intelligent (smart) ranking 840 of content and automatic categorization 870, according to one embodiment. System 800 includes three phases: daily (data) update processing 810, smart ranking processing 840 and categorization processing 870. To assist the SMEs 860, some embodiments are able to retrieve the most relevant documents/articles/etc. 830, such as articles and patents, from a large pool (or corpus) of documents 815 (e.g., PUBMED®, GOOGLE® Scholar, SCOPUS®, etc.) and rank them by relevance to the interest of the SMEs 860. PUBMED® is an example that may be used for scientific publications on life sciences and biomedical topics. The data is stored in highly efficient data storage engine. The approach of the embodiments significantly improves the efficiency of the SMEs 860 and ensures low probability of missing relevant documents. Further, the approach of the embodiments offers a functionality for automatic categorization 870 of articles/documents and delegation of the articles/documents for review to different SMEs 860, based on their expertise.

Using state-of-the-art information retrieval approaches, the daily (or periodically) update 810 of the architecture 800 generates a set of candidate documents 830 for a given set of queries. The set of queries is provided by the group of SMEs 860 using the system and could be updated at any point in time. The large pool of documents 815 is updated and stored in the storage repository 820 (e.g., databases in a file system, etc.). The SMEs 860 determine the search criteria processing 825 to end up with the resulting documents/articles/etc. 830. In one example, the daily update processing 810 includes crawling sources for document/articles/etc., updates.

In one embodiment, in the second phase the architecture 800 performs smart ranking processing 840 on the set of candidates obtained in the daily update processing 810. The ranking is based on state-of-the-art ranking processing/algorithms based on deep learning processing 845 (e.g., DNN processing, etc.). In one example, the processing strives to mimic the SME's 860 judgment process, which can be broken into three phases: first, identifying relevant locations in the text by searching keywords in the text. To increase the coverage, the search queries are expanded using an approach for dictionary expansion. Second, the processing determines the local relevance by capturing the context where the keyword is used, which can be positive or negative. Third, the processing performs aggregating local relevances and decides the final ranking score of the document. The ranked list of documents/articles/etc. 850 is presented to the SMEs 860 via a user interface on an electronic device 855 (e.g., a smart phone, a desktop computing device, a tablet/pad computing device, etc.). The SMEs 860 perform the adjudication that is fed back to the deep learning processing 845 to improve the performance in the next iteration. In one embodiment, the smart ranking processing 840 includes training a NN (e.g., a DNN, etc.) to provide a score for each document/article/etc. 830. The training is based on features from the document/article/etc. 830, such as n-grams, metadata (e.g., author, journal, date, etc.). In one example embodiment, the smart ranking processing 840 may be implemented in PYTHON® coding/scripting language using standard libraries for NNs.

In one embodiment, in the third phase the architecture 800 performs a fine-grained automatic categorization processing 870 of the selected documents/articles/etc. 875 in a set of user-defined categories. The set of categories can be updated at any point in time. In the user interface, the user can select one or more queries that has been generated by a group of SMEs 860 with domain knowledge. The user can quickly adjudicate by selecting or clicking on, for example, a right arrow or icon, to accept and for example, a left arrow or icon, to reject an article. The adjudication is fed back for retraining into the architecture 800 for it to learn via deep learning 880 about the user preferences. Once a document/article/etc. has been accepted, it can simply be categorized by, for example, selecting or clicking on a category 885 (see, e.g., user interface 1200, FIG. 12) from the list ranked by what it is most likely to be categorized as.

In one embodiment, while finding "good" documents is difficult, the architecture 800 excels at finding articles/documents/etc. that are not even worthy of consideration. Using this as part of the processing, the architecture 800 rejects over 95% of the articles/documents/etc. with over 95% precision. This processing reduces the SMEs 860 workload by a factor of twenty (20). The use of trimming the "bad" articles/documents/etc. significantly improves the efficiency of the SMEs 860 and ensures a low probability of missing relevant articles/documents/etc. The architecture 800 additionally offers a functionality for the automatic categorization (via automatic categorization processing 870) of articles/documents/etc. to assist in suggesting which experts might be most appropriate to act upon it and allowing the SME to confirm the selection.

Figure 9:
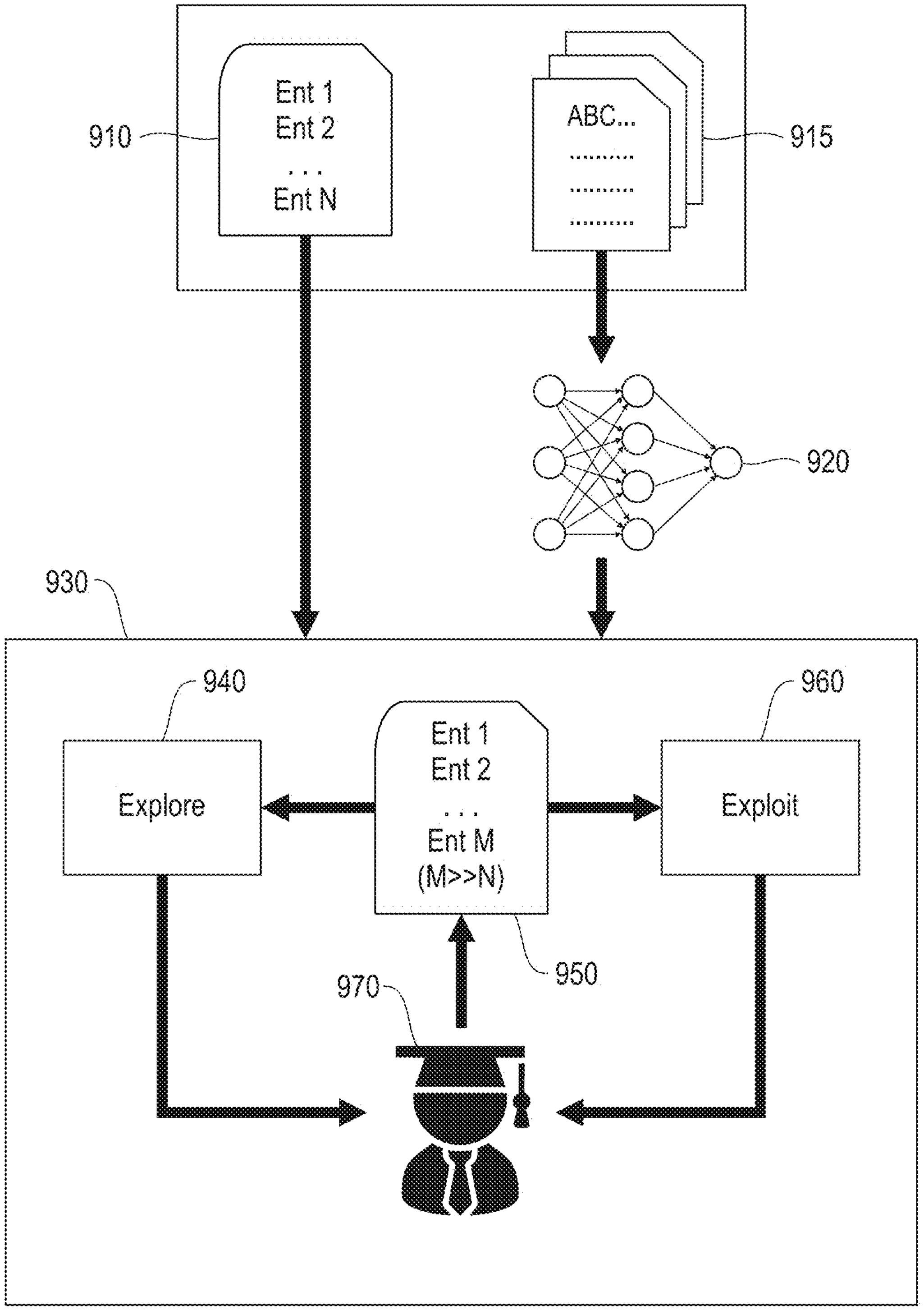
FIG. 9 illustrates a block diagram for automatic query refinement, according to one embodiment.

FIG. 9 illustrates a block diagram for automatic query refinement, according to one embodiment. In one embodiment, the automatic query refinement is processed in the smart ranking processing 840 (FIG. 8). In one embodiment, given an input text corpus 910 and a small set of seed examples 915, the architecture 800 (FIG. 8) builds a neural language model 920. In one embodiment example, Word2vec may be implemented or a similar modeling for deep learning processing for the neural language model 920. Word2vec is a set or group of related models that produce word embeddings. The models are two-layer NNs that are trained to reconstruct linguistic contexts of words. Word2vec uses a large corpus of text as input and produces a vector space (e.g., several hundred dimensions) with each unique word in the corpus being assigned a corresponding vector in the space. In processing block 930, new dictionary candidates are identified using an explore process 940 and an exploit process 960. In one embodiment, the explore process 940 and the exploit process 960 may implement known explore/exploit (or explore and exploit (ENE)) tradeoff schemes, which may also be known as solving the classical multi-armed bandit problem employing machine learning (e.g., based on a theoretical slot machine with more than one arm. Each arm of this slot machine returns a reward of varying magnitude and each time the hypothetical player pulls an arm of the slot machine, the user must pay a set price. Once the user pulls at least one arm, he examines the reward he has received from each past pull, as well as the price the user has already paid and uses this information to decide which arm to pull next. The solution to the multi-armed bandit problem is a sequence in which to pull the arms of the slot machine that optimizes payout to the user). The results from explore process 940 and the exploit process 960 are used to rank the documents/articles/etc. candidates 950, which are presented to the user (SME 970). The user accepts/rejects the candidates 950. The accepted candidates 950 are stored in a dictionary or repository. Next, the processing block 930 processes the next iteration, and stops processing when either the user is satisfied with the amount of produced lexicon items or no more data can be generated. Examples of results from automatic query refinement for Titanium Oxide, coffee and novel proteins are as follows:

Titanium dioxide: "titanium", "tio2", "anatase", "brookite", "rutile", "e171", "titania", "tio(2"

Coffee: "arabica", "decaffeinated", "coffee", "caffe", "coffea", "caffeine", "robusta", "eugenioides", "canephora"

Novel proteins: "insect food", "insect feed", "cricket flour", "cricket bar", "cricket chocolate", "edible black ants", "cricket pasta", "insects food", "insects feed", "cricket biscuits", "cricket bread breakfast", "chapulines", "edible insect", "cricket fruit", "manchurian scorpions"

. . .

Figure 10:
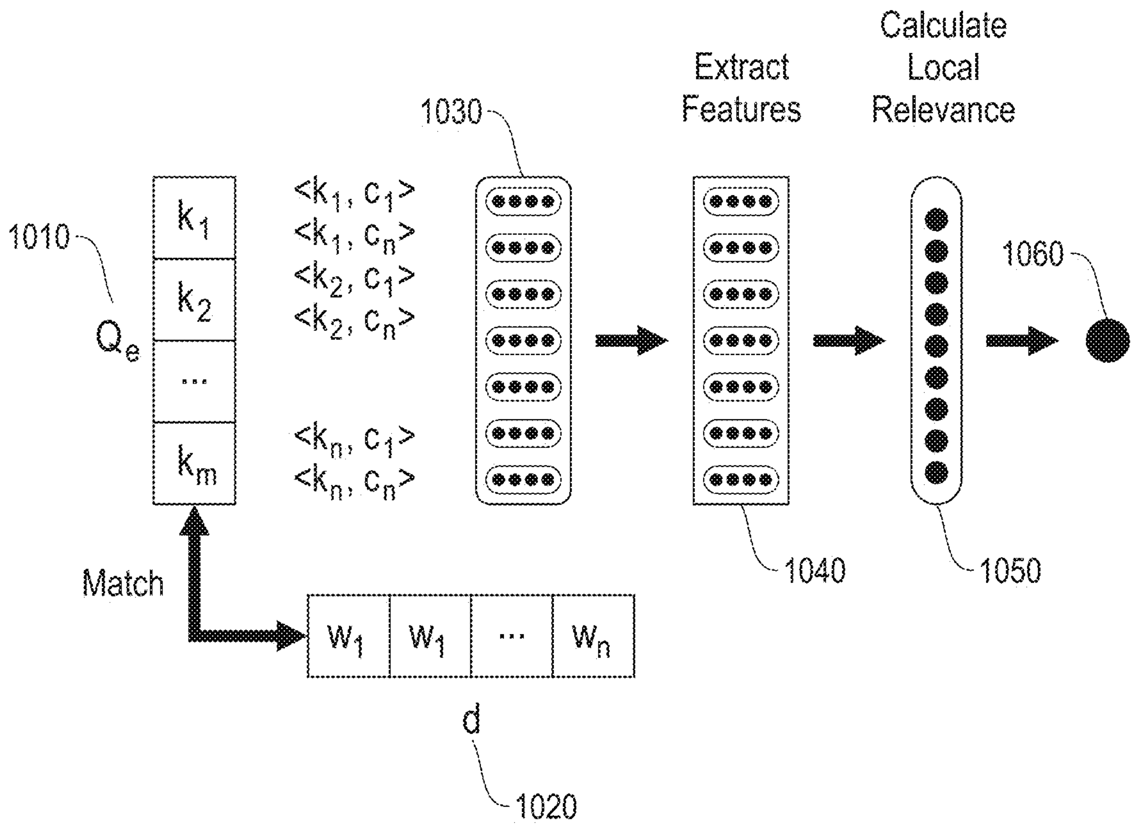
FIG. 10 illustrates a flow representation diagram for document ranking, according to one embodiment.

FIG. 10 illustrates a flow representation diagram for document ranking, according to one embodiment. In one embodiment, given an input query with a set of keywords $Q=[k_1, k_2, k_n]$ and a set of documents/articles/etc. D: extend the query Q 1010 using automatic query refinement based on Dirichlet Latent Allocation (DLA) model or ENE: $Q_e=[k_1, k_2, \ldots k_m]$ 1010, where m>n. In one embodiment, the ranking processing matches $Q_e$ 1010 with each document d 1020 $\in$D resulting in concatenated word embedding for each tuple 1030, and performs processing 1040 that extracts features (contexts) for each matched keyword in the current document d 1020: $k_{1c}=[c_1, c_2, \ldots c_1], \ldots k_n=[c_1, c_2, \ldots c_1]$. Processing 1050 is performed to calculate local relevance for each triple<k,c,d> across all matched documents for query Q. Processing 1060 is performed to aggregate local relevance scores in a single score r for all tuples<k,c> for a document d 1020, and assigns that score to the document.

Figure 11:
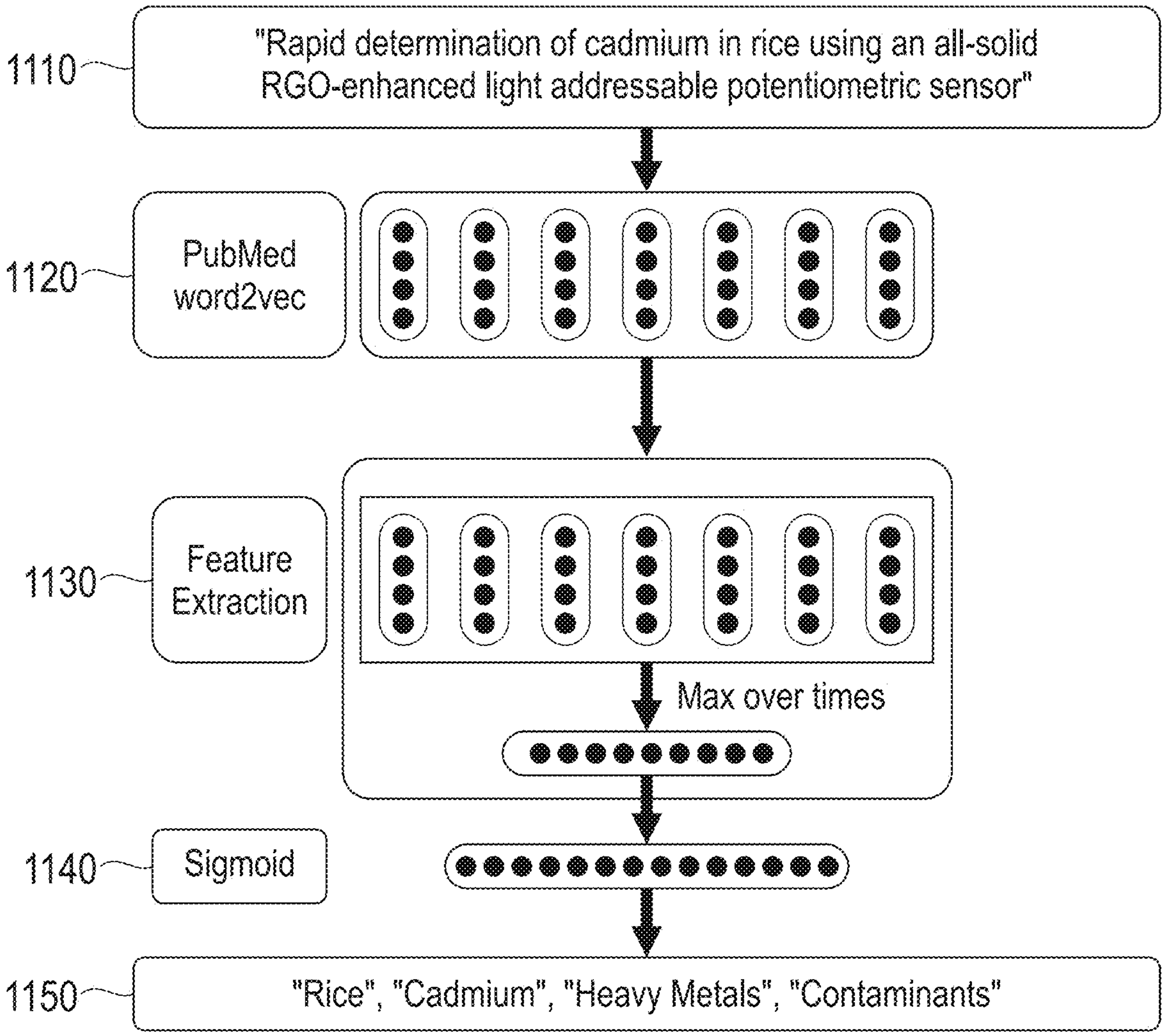
FIG. 11 illustrates a flow representation diagram for fine grained categorization of articles, according to one embodiment.

FIG. 11 illustrates a flow representation diagram for fine grained categorization of articles, according to one embodiment. In one embodiment, the processing for architecture 800 (FIG. 8) performs a fine-grained categorization of the selected documents in a set of user-defined categories. In one example, the query 1110 is for "Rapid determination of cadmium in rice using an all-solid RGO-enhanced light addressable potentiometric sensor." The processing block 1120 includes using a repository or corpus, such as PUBMED®, to find, for example, 2000 articles, to build a multi-label model (e.g., using Word2vec, etc.). In one embodiment, feature extraction processing 1130 is next and a sigmoid function (e.g., a hard sigmoid) 1140 is used for testing the model as a way of understanding the output of a node or neuron. The example results 1150 include "Rice," "Cadmium," "Heavy Metals, "Contaminants." The categorization of documents/articles/etc. allows sorting according to areas defined by the SME.

Figure 12:
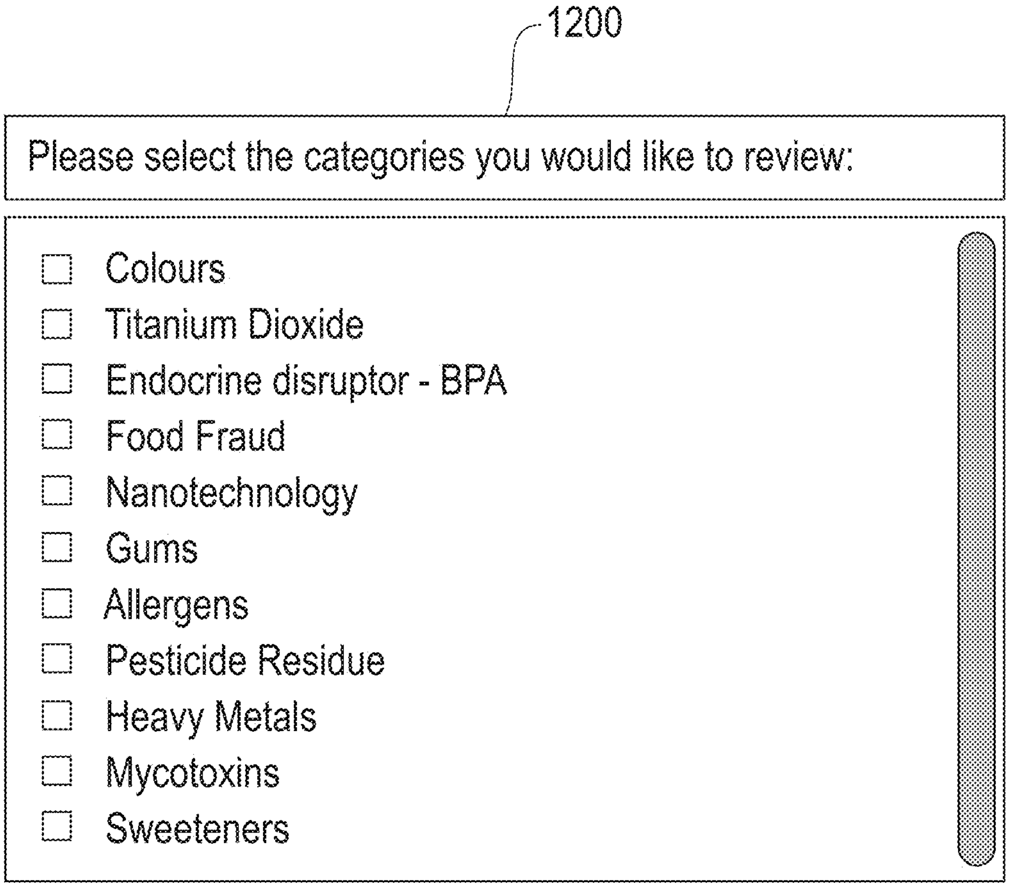
FIG. 12 illustrates an example subject matter expert (SME) interface for selection of document categories, according to one embodiment.

FIG. 12 illustrates an example subject matter expert (SME) interface 1200 for selection of document categories, according to one embodiment. Using the user interface 1200, the SME can select one or more categories of documents to work with. In one example embodiment, the SME selects the different categories using an input device, such as a computing cursor (e.g., from a mouse, stylus, etc.) or finger or tool on a touch-screen to select one or more categories.

Figure 13A:
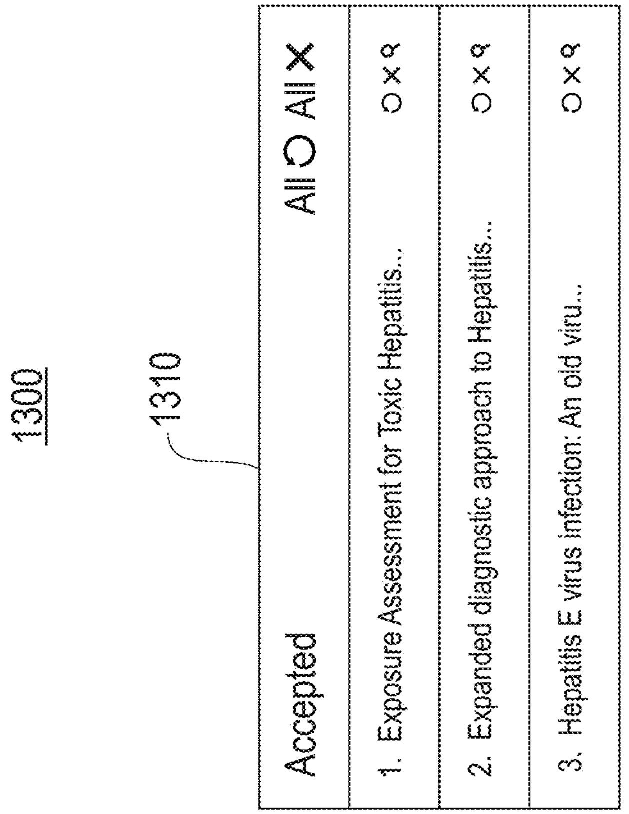
FIGS. 13A-B illustrate an example SME interface for SME adjudication, according to one embodiment.
Figure 13B:
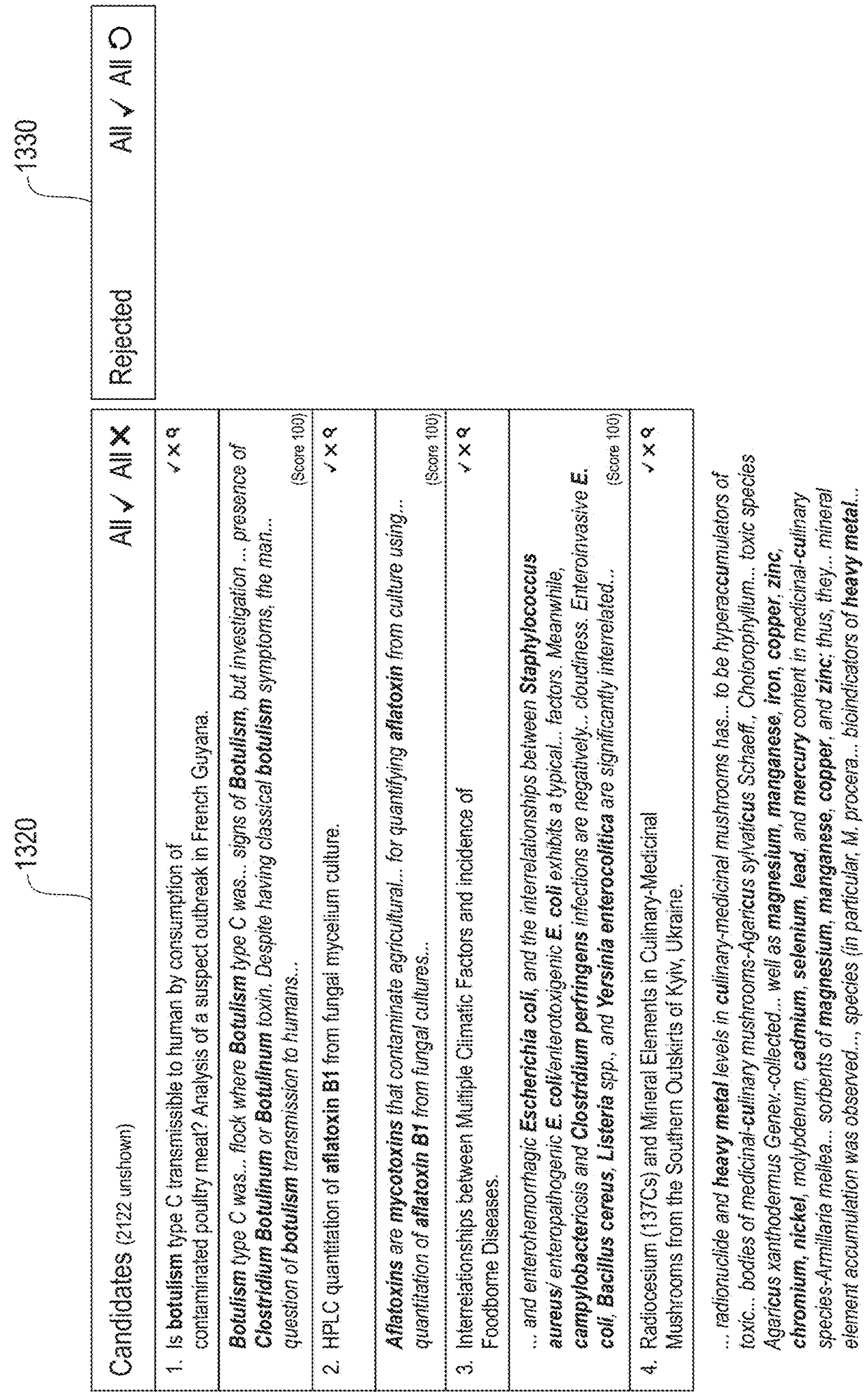

FIGS. 13A-B illustrate an example SME interface 1300 for SME adjudication, according to one embodiment. The ranked list of documents/articles/etc. for the selected categories is presented to the SMEs using the interface 1300. In one embodiment, the interface 1300 includes accepted documents/articles/etc. 1310, candidates 1320 and rejected documents/articles/etc. 1330. The SMEs can quickly adjudicate by, for example, selecting (e.g., clicking using a mouse, stylus, etc., using a touch screen, etc.) on a check symbol to accept and selecting (e.g., clicking using a mouse, stylus, etc., using a touch screen, etc.) on an "x" symbol to reject a document. The adjudication is fed back into the architecture 800 (FIG. 8) to improve the performance in the next iteration.

FIGS. 14A-B illustrate an example SME interface 1400 for document categorization after acceptance, according to one embodiment. Once a document/article/etc. has been accepted, the SME can categorize the document by selecting (e.g., clicking using a mouse, stylus, etc., using a touch screen, etc.) on a category button, icon, etc. The candidates requiring categorization are shown in the list 1410. The categories shown in the list 1410 is ranked using the architecture 800 to determine the most likely categorizations. The background 1420 on the document/article/etc. is displayed along with a list of categories 1430. In one embodiment, an SME selects a document/article/etc. in the list 1410 and the likely categories are displayed for that document/article/etc.

Figure 15:
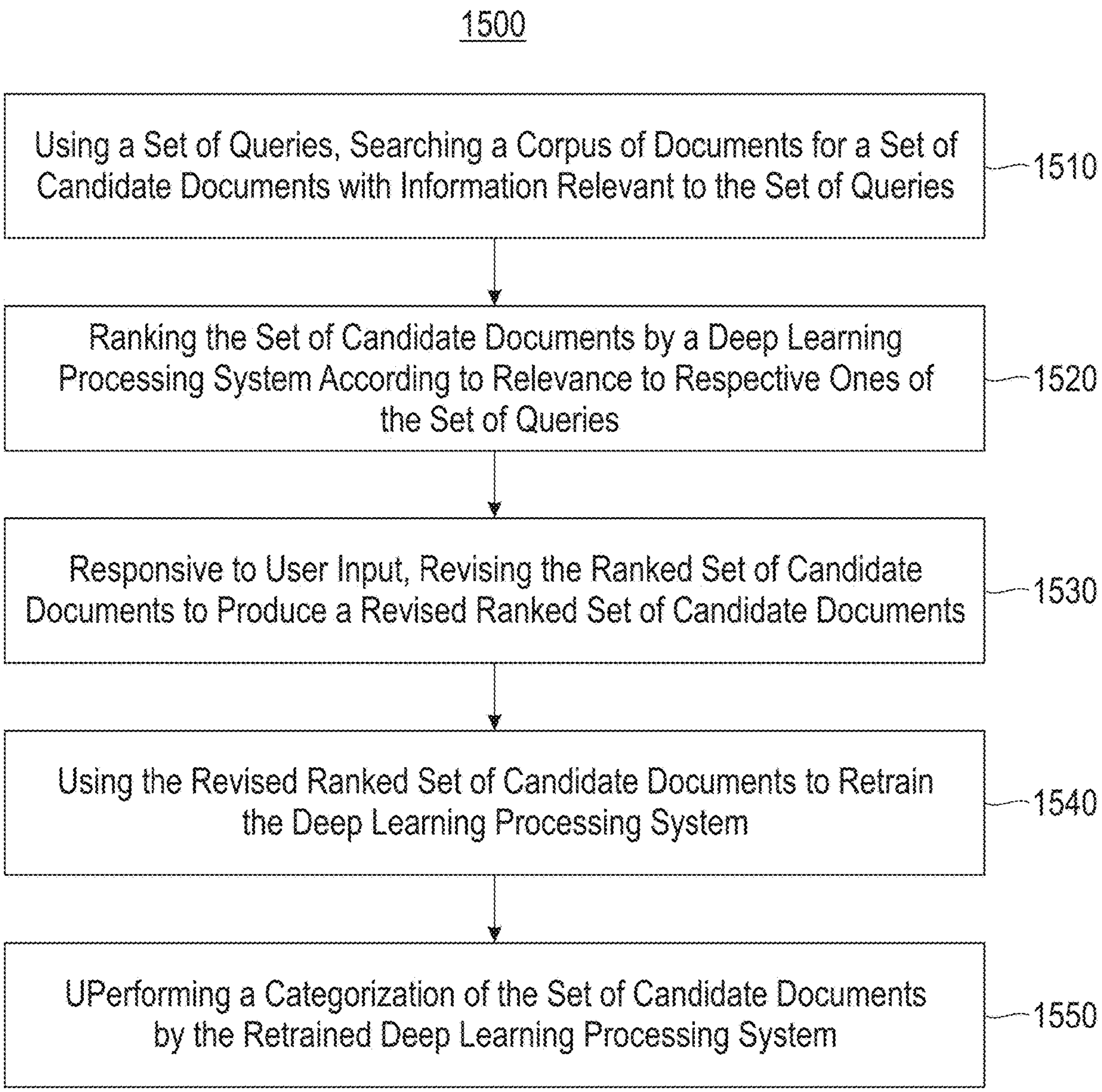
FIG. 15 illustrates a block diagram of a process for cognitive horizon surveillance including intelligent ranking of content and automatic categorization processing, according to one embodiment.

FIG. 15 illustrates a block diagram of a process 1500 for cognitive horizon surveillance including intelligent ranking of content and automatic categorization processing, according to one embodiment. In one embodiment, in block 1510, process 1500 uses a set of queries to search a corpus of documents (e.g., PUBMED®, GOOGLE® Scholar, SCOPUS®, etc.) for a set of candidate documents with information relevant to the set of queries (e.g., by using a computing device such as from computing node 10, FIG. 1, hardware and software layer 60, FIG. 2, processing system 300, FIG. 3, system 400, FIG. 4, system 500, FIG. 5, architecture 800, FIG. 8, etc.). In block 1520, process 1500 further performs ranking (e.g., smart ranking processing 840, FIG. 8) the set of candidate documents by a deep learning processing system (e.g., architecture 800, FIG. 8, deep learning processing 845) according to relevance to respective ones of the set of queries. In block 1530, process 1500 further provides responsive to user input, revising the ranked set of candidate documents to produce a revised ranked set of candidate documents. In block 1540, process 1500 additionally provides using the revised ranked set of candidate documents to retrain the deep learning processing system. In block 1550, process 1500 further provides for performing a categorization (e.g., using categorization processing 870, FIG. 8) of the set of candidate documents by the retrained deep learning processing system.

In one embodiment, process 1500 may further include the feature that the deep learning processing system finds documents to reject for determining candidate documents.

In one embodiment, process 1500 may additionally include the feature that updating the set of queries based on a periodic schedule.

In one embodiment, process 1500 may still additionally include the feature that the categorization is based according to a set of user defined categories.

In one embodiment, process 1500 may yet additionally include the feature of responsive to user input, revising the set of user defined categories.

In one embodiment, process 1500 may further include the feature of responsive to user input, selecting one of the set of queries, and displaying, using a user interface, categorized documents which satisfy the selected query.

In one embodiment, process 1500 may still further include the feature of performing the categorization of the set of candidate documents by the retrained deep learning processing system comprises ranking categorizations based on prediction for most likely categorizations.

In one embodiment, process 1500 may include the feature that the method is repeated on a periodic basis, such that the deep learning system is continually retrained.

Some embodiments significantly reduce user workload by a large factor (e.g., a factor of twenty (20)). Some features contribute to the advantage of significantly improving the efficiency of users and ensures a low probability of missing relevant articles/documents/etc. Some other features contribute to the advantage of offering a functionality for the automatic categorization of articles/documents/etc. to assist in suggesting which experts might be most appropriate to act upon it.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method for ranking relevance of documents comprising:

using a set of queries, searching a corpus of documents for a set of candidate documents with information relevant to the set of queries, wherein the set of queries comprise keywords;

ranking the set of candidate documents by a deep learning processing system, wherein the ranking comprises:

for each document of the set of candidate documents:

identifying relevant locations in a text of the document by searching the keywords in the text;

determining at least one local relevance of at least one keyword of the keywords by capturing at least one context where the at least one keyword is used; and assigning a ranking score to the document by aggregating the at least one local relevance;

responsive to user input relating to selections via a user interface for user preferences, revising the ranked set of candidate documents to produce a revised ranked set of candidate documents;

using the revised ranked set of candidate documents to retrain the deep learning processing system including feeding back adjudication from the user input for improvement of performance of the deep learning processing system for a next iteration of processing by rejecting a majority of the set of candidate documents; and performing a categorization of the set of candidate documents by the retrained deep learning processing system, wherein the categorization comprises displaying a ranked list of different categories that are most likely for a candidate document selected using user input from the user interface, and assigning at least one of the different categories selected using further user input from the user interface to the candidate document, and wherein the ranked list provided via the user interface includes, for each category of the different categories, a visual indication of a likelihood, predicted by the retrained deep learning processing system, that the category is suitable for the candidate document, and a sort button that sorts the different categories based on each score corresponding to each category of the different categories that is indicative of a likelihood, predicted by the retrained deep learning processing system, that the category is suitable for the candidate document.

2. The method of claim 1, wherein the deep learning processing system finds documents to reject for determining candidate documents for automatic query refinement.

3. The method of claim 1, further comprising:

updating the set of queries based on a periodic schedule; and expanding the set of queries by utilizing a dictionary to find additional keywords that match some of the keywords, wherein the expanded set of queries includes the additional keywords.

4. The method of claim 1, wherein the categorization is based according to a set of user defined categories, the user defined categories are displayed in the ranked list, and background for candidate documents are displayed with the ranked list.

5. The method of claim 4, further comprising:

responsive to user input, revising the set of user defined categories.

6. The method of claim 1, further comprising:

responsive to user input, selecting one of the set of queries; and displaying, using a user interface, categorized documents which satisfy the selected query.

7. The method of claim 1, wherein the method is repeated on a periodic basis, such that the deep learning processing system is continually retrained.

8. A computer program product for ranking relevance of documents, the computer program product comprising a computer readable storage medium having program instructions embodied therewith, the program instructions executable by a processor to cause the processor to:

using a set of queries, search, by the processor, a corpus of documents for a set of candidate documents with information relevant to the set of queries, wherein the set of queries comprise keywords;

rank, by the processor, the set of candidate documents by a deep learning processing system, wherein the ranking comprises:

for each document of the set of candidate documents:

identifying relevant locations in a text of the document by searching the keywords in the text;

determining at least one local relevance of at least one keyword of the keywords by capturing at least one context where the at least one keyword is used; and assigning a ranking score to the document by aggregating the at least one local relevance;

responsive to user input relating to selections via a user interface for user preferences, revise, by the processor, the ranked set of candidate documents to produce a revised ranked set of candidate documents;

using the revised ranked set of candidate documents, retrain, by the processor, the deep learning processing system including feeding back adjudication from the user input for improvement of performance of the deep learning processing system for a next iteration of processing by rejecting a majority of the set of candidate documents; and perform, by the processor, a categorization of the set of candidate documents by the retrained deep learning processing system using further user input from the user interface, wherein the categorization comprises displaying a ranked list of different categories that are most likely for a candidate document selected using user input from the user interface, and assigning at least one of the different categories selected using further user input from the user interface to the candidate document, and wherein the ranked list provided via the user interface includes, for each category of the different categories, a visual indication of a likelihood, predicted by the retrained deep learning processing system, that the category is suitable for the candidate document, and a sort button that sorts the different categories based on each score corresponding to each category of the different categories that is indicative of a likelihood, predicted by the retrained deep learning processing system, that the category is suitable for the candidate document.

9. The computer program product of claim 8, wherein the deep learning processing system finds documents to reject for determining candidate documents for automatic query refinement.

10. The computer program product of claim 8, wherein the program instructions executable by the processor further cause the processor to:

update, by the processor, the set of queries based on a periodic schedule; and expand, by the processor, the set of queries by utilizing a dictionary to find additional keywords that match some of the keywords, wherein the expanded set of queries includes the additional keywords.

11. The computer program product of claim 8, wherein the categorization is based according to a set of user defined categories, the user defined categories are displayed in the ranked list, and background for candidate documents are displayed with the ranked list.

12. The computer program product of claim 11, wherein the program instructions executable by the processor further cause the processor to:

responsive to user input, revise, by the processor, the set of user defined categories.

13. The computer program product of claim 8, wherein:

the program instructions executable by the processor further cause the processor to:

responsive to user input, select, by the processor, one of the set of queries; and using a user interface, display, by the processor, categorized documents which satisfy the selected query.

14. The computer program product of claim 8, wherein the program instructions are repeated on a periodic basis, such that the deep learning processing system is continually retrained.

15. An apparatus comprising:

a memory configured to store instructions; and a processor configured to execute the instructions to:

using a set of queries, search a corpus of documents for a set of candidate documents with information relevant to the set of queries, wherein the set of queries comprise keywords;

rank the set of candidate documents by a deep learning processing system, wherein the ranking comprises:

for each document of the set of candidate documents:

identifying relevant locations in a text of the document by searching the keywords in the text;

determining at least one local relevance of at least one keyword of the keywords by capturing at least one context where the at least one keyword is used; and assigning a ranking score to the document by aggregating the at least one local relevance;

responsive to user input relating to selections via a user interface for user preferences, revise the ranked set of candidate documents to produce a revised ranked set of candidate documents;

using the revised ranked set of candidate documents, retrain the deep learning processing system including feeding back adjudication from the user input for improvement of performance of the deep learning processing system for a next iteration of processing by rejecting a majority of the set of candidate documents; and perform a categorization of the set of candidate documents by the retrained deep learning processing system using further user input from the user interface, wherein the categorization comprises displaying a ranked list of different categories that are most likely for a candidate document selected using user input from the user interface, and assigning at least one of the different categories selected using further user input from the user interface to the candidate document, and wherein the ranked list provided via the user interface includes, for each category of the different categories, a corresponding score indicative of a likelihood, predicted by the retrained deep learning processing system, that the category is suitable for the candidate document, and a sort button that sorts the different categories based on each score corresponding to each category of the different categories that is indicative of a likelihood, predicted by the retrained deep learning processing system, that the category is suitable for the candidate document.

16. The apparatus of claim 15, wherein:

the processor is further configured to execute the instructions to:

update the set of queries based on a periodic schedule; and expand the set of queries by utilizing a dictionary to find additional keywords that match some of the keywords, wherein the expanded set of queries includes the additional keywords; and the deep learning processing system finds documents to reject for determining candidate documents for automatic query refinement.

17. The apparatus of claim 15, wherein the categorization is based according to a set of user defined categories, the user defined categories are displayed in the ranked list, and background for candidate documents are displayed with the ranked list.

18. The apparatus of claim 17, wherein:

the processor is further configured to execute the instructions to:

responsive to user input, revise the set of user defined categories;

responsive to user input, select one of the set of queries; and using a user interface, display categorized documents which satisfy the selected query.

19. The apparatus of claim 15, wherein the processor is further configured to execute the instructions to:

repeat the execution of instructions on a periodic basis, such that the deep learning processing system is continually retrained.

* * * * *